Patented Mar. 21, 1939

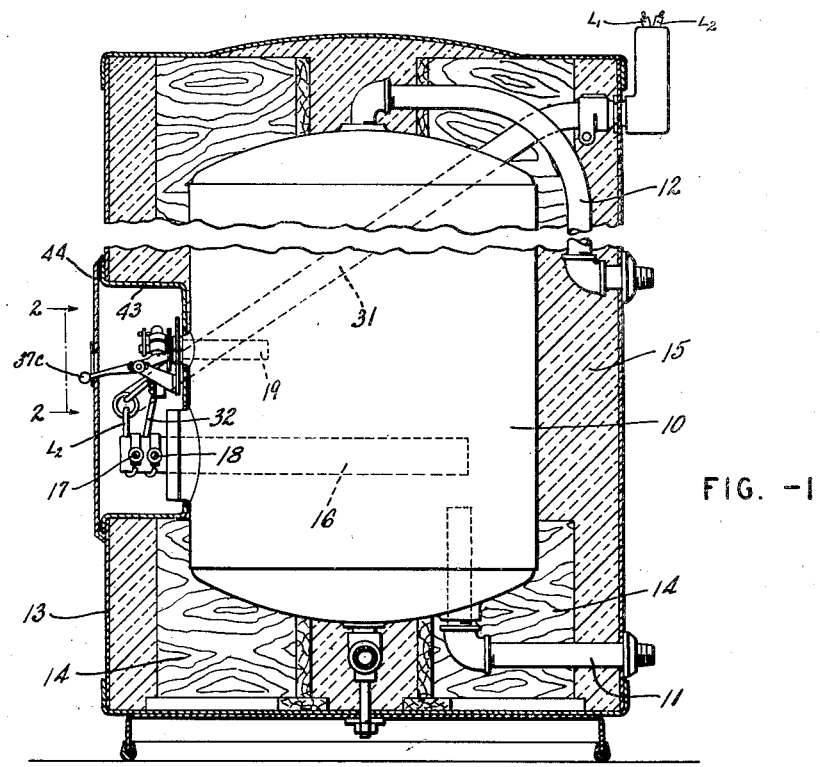

2,151,562

UNITED STATES PATENT OFFICE 2,151,562

CONTROL MECHANISM FOR WATER HEATERS AND THE LIKE

Clarence H. Morrow, Shaker Heights, Ohio, assignor to The Hotstream Heater Company, Cleveland, Ohio, a corporation of Ohio Application April 9, 1936, Serial No. 73,509

3 Claims. (Cl. 200—138)

This invention relates to improvements in a control mechanism for water heaters and the like.

The usual type of construction for water heaters includes a water reservoir or tank with a heating unit arranged to heat the water, and a thermostatic control responsive to water temperature for controlling the heating unit. My invention provides novel control mechanism for a thermostatic unit responsive to water temperature for controlling the heating unit. My invention provides novel control mechanism for a thermostatic unit in a combination such as just has been described and more particularly a manually operable means for permitting or preventing operation of the thermostatic unit when desired.

Novel structural arrangements for carrying out my purpose are illustrated in the accompanying drawing and described in the specification and the essential features thereof are summarized in the claims.

In the drawing, Fig. 1 is an elevation in section showing a water heater equipped with my control device; Fig. 2 is an enlarged fragmental elevational view taken approximately in the position 2—2 of Fig. 1, with the cover plate cut away to more clearly show the arrangement of the parts behind it; Fig. 3 is a sectional view along the line 3—3 of Fig. 2; while Fig. 4 is a detail sectional view taken along the line 4—4 of Fig. 3.

I have illustrated my invention as applied to a water heater comprising a tank or reservoir 10 having a water inlet conduit 11 and an outlet conduit 12. The heater is enclosed in a cabinet 13 wherein the reservoir is supported by suitable spacing members 14 and packed with heat insulating material 15.

Suitable heating means is provided for raising the temperature of the water in the reservoir 10 and in the present instance the heating means is an electrical heating unit 16 of a well known type in which heat is generated by the resistance of wires which are brought out to suitable binding posts 17 and 18. A thermostatic control member is indicated at 19, the same having a threaded engagement at 20 with a boss on the wall of the reservoir 10. The thermostat is of a well known type wherein a change of temperature causes a rotative movement of a shaft 19a located axially of the thermostatic element and connected with the spirally wound tube of the thermostatic element. A cradle 21 is mounted for free oscillation about the shaft 19a and supports an oscillating mercury switch 22 having terminals 22a and 22b, there being the usual pool of mercury 22c adapted upon tube oscillation to make and break contact between the terminals 22a and 22b. An arm 23 rigid with shaft 19a engages a bracket 24 rigid with the cradle 21 to oscillate the tube of the mercury switch 22 in circuit breaking direction or counterclockwise as shown in Fig. 2. To insure movement of the mercury switch in circuit establishing direction a counterweight 25 is mounted on an arm rigid with the cradle 21. Suitable flexible wires 26 and 27 connect the mercury switch terminals to the binding posts 28 and 29. Means indicated generally at 30 is provided for various settings of the thermostat so that the switch is oscillated in circuit making direction at the desired temperature. The means indicated generally at 30 comprises an oscillatable slotted member rigidly connected with one end of the spiral thermostatic element 19. This member is held in various positions by a set screw which enters plate 33. This is a well-known means for varying the effect of a thermostat of this type.

The electrical connections for operating the device comprise lead wires $L_1$ and $L_2$ connected to a suitable source of electric current and passing through a conduit housing 31 to the vicinity of the thermostatic control and electrical heating units. $L_1$ is connected to the binding post 28 while $L_2$ is connected to the binding post 17. A wire 32 connects binding post 29 with binding post 18. While the mercury switch 22 is shown in its "off" position in all of the views, it will be understood by those versed in this art that when the temperature of the water falls below a predetermined point the mercury tube will be oscillated in a clockwise direction as seen in Fig. 2 so that the pool of mercury 22c forms an electrical conducting circuit between the terminals 22a and 22b. The following operating circuit through the system is then established: $L_1$, 26, 22a, 22c, 22b, 27, 32, 18, the wires of the electrical unit 16, 17 and $L_2$. When the water in the reservoir 10 reaches a predetermined high level the thermostatic unit will return the mercury switch to the position of Fig. 2 and the electrical circuit will be broken.

I have provided novel means for controlling the operation of the electrical circuit as desired by the person operating the heater. To this end a base plate 33 is secured to the thermostatic member 19 and a bracket 34 is rigidly mounted on this base plate. This bracket extends toward the front of the heater or to the left as viewed in the various drawings and is provided at its forward end with an elongated slot 35. This bracket 34 is preferably of sheet metal from which is struck up a stop member 36. A lever 37 is pivotally mounted intermediate its ends by a pivot construction which engages in the slot 35. This construction is best seen in Fig. 4 and comprises a sleeve member 38 which engages in a suitable opening 39 in the lever 37 so as to provide a pivotal mounting of the lever on the sleeve 38. A screw 40 passes through the sleeve 38 and loosely through the slot 35 and is secured by a nut 41 threaded on the screw, the nut being preferably provided with a knurled surface so that it may be tightened up to hold the sleeve 38 tightly against the bracket 34 in any adjusted position along the slot 35. This permits the moving of the sleeve 38 from front to rear of the slot 35 so as to adjust the pivot for the lever 37. A spring 42 is looped about the nut 41 and has its opposite ends engaging one below lever 37 and the other below bracket 34 so as to bias the lever 37 in a clockwise direction as seen in Fig. 3. The inner end 37a of the lever 37 is provided with a surface 37b curving upwardly and adapted to engage below the counterweight 25 when the lever is in the full line position of Fig. 3 and to hold the counterweight in its raised position. Movement of this end of the lever in a clockwise direction is limited by the stop member 36. The lever 37 is preferably of sheet metal of the nature of No. 18 gauge and is arranged to extend outwardly to the front of the heater where it is provided with an operating knob 37c. It will be noted that a casing 43 surrounds the forward ends of the thermostatic and electrical heating units encasing the mercury switch, the lever 37 and the terminals 17 and 18 for the electrical heating unit. This casing has a cover member 44 which closes the front thereof, there being an opening 45 in the cover member over which is secured a plate 46. This plate has a hook-shaped slot 47 through which the lever 37 is adapted to extend. The forward end of the lever occupies the portion 47a of the slot when the lever is in unactuated position and occupies the portion 47b of the slot when the lever is in actuated position.

In the construction and operation of the device, the position of the thermostatic unit 19 will vary somewhat, depending upon the engagement of the threads at the point 20 and depending upon slight variations in the casing 43 and the insulation 15. After the heater is assembled with the thermostatic element in its final position, the lever 37 is adjusted by movement of its pivotal mounting in the slot 35 so as to extend the operating knob 37c to the proper position just in front of the plate 46. The curved surface 37b of the inner end of the lever is adapted to cooperate with the counterweight 25 in various adjusted positions of the lever pivot.

In the operation of the device if the heating unit is to operate in its usual manner to maintain a predetermined temperature of the water in the reservoir 10, the lever 37 is manipulated by its knob 37c to the the upper portion 47a of the slot 47 and remains in that position due to the bias of spring 42. The mercury switch is then free to oscillate responsive to the thermostatic unit 19 as long as the lever 37 remains in the broken line position of Fig. 3. To prevent operation of the heating unit 16, the knob 37c is moved downwardly and to the left as viewed in Fig. 2 until the lever 37 rests in the lower portion 47b of the slot 47 and is maintained in this position by the bias of the spring 42. This raises the inner end 37a of the lever to the position shown in full lines in Figs. 2 and 3, thus holding the counterweight 25 and cradle 21 in the position of Fig. 2 and preventing movement of the mercury switch in a clockwise direction which prevents energization of the electrical circuit for the heating unit 16. When the lever 37 is again moved from the full line position of Fig. 3 to the broken line position thereof, if the water in the reservoir 10 has cooled to the point where heat is demanded by the thermostat, the mercury switch will immediately oscillate in clockwise direction and establish the electrical circuit for the heating unit 16.

Due to the flexibility of lever 37 and the slight play permitted between the lever 37 and the pivotal sleeve 38, the forward end of the lever 37 may be manipulated into the slot portion 47b as shown.

What I claim is:

1. In a control system for a water heater having a water reservoir, having means for heating the water therein, having control means for said heating means including a mercury switch oscillatable to "on" and "off" positions, and having a thermostat responsive to water temperature for oscillating said switch; in such a system a casing enclosing said switch, there being a vertically extending opening through a wall of said casing, said opening having a laterally offset portion at its lower end, a bracket, a slot in said bracket, a lever flexible in a lateral direction and pivotally mounted intermediate its ends in said slot, one end of said lever operatively engaging said switch and adapted to hold said switch in "off" position, the other end of said lever extending toward the said wall of said casing and through said opening, said lever pivot being adjustable to various positions in said slot to insure the extension of said lever through said opening, and means biasing said other end of said lever upwardly, whereby said lever is normally biased toward the upper end of said opening or, when said lever is flexed laterally into said offset portion of said opening it is held there by said biasing means.

2. In a control system for a water heater having a water reservoir, having means for heating the water therein, having control means for said heating means including a mercury switch oscillatable to "on" and "off" positions, and having thermostatic means responsive to the temperature of the water in said reservoir for oscillating said mercury switch; in such system a casing enclosing said switch and having an outer wall, a lever support in said casing, a lever pivotally mounted on said support and manually movable in one direction for releasably holding said switch in its "off" position, yieldable means for normally urging said lever in a different direction, the outer end of said lever and said lever support being relatively adjustable to enable such lever outer end to be located outside said casing outer wall for convenient manual manipulation, and said casing outer wall having means for cooperation with said lever to enable said lever, when desired, to releasably retain said switch in its "off" position.

3. In a control system for a water heater having a water reservoir, having means for heating the water therein, having control means for said heating means including a mercury switch oscillatable to "on" and "off" positions, and having thermostatic means responsive to the temperature of the water in said reservoir for oscillating said mercury switch; in such system a casing enclosing said switch and having an outer wall, a slotted support in said casing, a lever pivotally mounted in the slot of said support and manually movable in one direction for releasably holding said switch in its "off" position, yieldable means for normally urging said lever in a different direction, the pivot of said lever being adjustable in the slot of said lever support toward and from the outer wall of said casing to enable the outer end of said lever to be located outside said casing outer wall for convenient manual manipulation, and said casing outer wall having means for cooperation with said lever to enable said lever, when desired, to releasably retain said switch in its "off" position.

CLARENCE H. MORROW.